United States Patent
Wood et al.

(10) Patent No.: US 6,520,599 B2
(45) Date of Patent: Feb. 18, 2003

(54) FOUR PORT VARIABLE LOAD VALVE WEIGH SYSTEM FOR A BRAKE PIPE CONTROLLED BRAKE SYSTEM

(75) Inventors: James A. Wood, Spartanburg, SC (US); John P. Condrasky, Simpsonville, SC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/849,182

(22) Filed: May 5, 2001

(65) Prior Publication Data

US 2002/0163248 A1 Nov. 7, 2002

(51) Int. Cl.[7] .................................................. B60T 8/18
(52) U.S. Cl. ........................ 303/22.4; 303/128; 303/15; 303/22.6
(58) Field of Search ............................. 303/3, 7, 9, 15, 303/128, 22.2, 22.4, 22.6, 22.1, 22.7, 20

(56) References Cited

U.S. PATENT DOCUMENTS 5,147,114 A * 9/1992 Hommen et al. .............. 303/15
5,662,391 A * 9/1997 McKay ....................... 303/22.4

* cited by examiner

Primary Examiner—Pam Rodriguez
Assistant Examiner—Thomas J. Williams
(74) Attorney, Agent, or Firm—James Ray & Associates (57) ABSTRACT

A pneumatic system serves as a backup to the electronic system that normally provides load compensation on a railcar truck during both service and emergency applications of the brakes. The pneumatic system compensates for the load railcar bears during service and emergency brake applications whenever the electronic load compensation system fails due to a loss of power or other electrical failure. Ideal for railcar trucks equipped with brake pipe controlled brake equipment, the pneumatic system provides load compensation through use of a four-port variable load valve in combination with a low complexity MC-30A-1 control valve.

20 Claims, 5 Drawing Sheets

FOUR PORT VARIABLE LOAD VALVE WEIGH SYSTEM FOR A BRAKE PIPE CONTROLLED BRAKE SYSTEM

FIELD OF THE INVENTION

The invention generally relates to systems that compensate for the weight of the load borne by a railcar in formulating the braking effort to be applied to the wheels of the railcar. More particularly, the invention pertains to a simplified pneumatic system that can be used as a backup to an electronic system that normally provides load compensation on a railcar during both service and emergency applications of the brakes.

BACKGROUND OF THE INVENTION

The following background information introduces one of the many possible environments in which the invention can be used. This information is provided to assist the reader to understand the invention, as novel material is often more readily understood if described in a familiar context. The terms used herein are not intended to be limited to any particular narrow interpretation unless expressly stated otherwise in this document.

A passenger transit train typically includes a locomotive, a plurality of railcars and several trainlines. The brake control system in such a train typically features a central controller in the locomotive through which to control the brakes on the trucks of all the vehicles that comprise the train. Riding in the locomotive, a train operator uses a brake handle or like device to apply and release the brakes as desired. The inputs from the brake handle(s) are typically processed by a cab control unit and passed to the central controller. In response to these and other inputs, the central controller then sends a brake command signal to the vehicles of the train in the form of either a pneumatic signal or an electrical signal or even both.

The trainlines include both pneumatic and electrical lines, most of which run from the locomotive to the last railcar in the train. The main reservoir (MR) pipe is one such pneumatic trainline. It consists of a series of individual pipe lengths. Secured to the underside of each railcar, one such pipe length connects via a coupler to another such pipe length secured to a neighboring railcar. Essentially one long continuous pipe that runs the length of the train, the MR pipe is charged by various air compressors dispersed throughout the train. The brake control system uses the MR pipe to supply air to the various known reservoirs and to supply the air that is needed to charge the brake cylinders of each truck during brake applications.

In the passenger transit industry, many trains are equipped with a type of brake control system that directs control of the brakes via a pneumatic trainline known as the brake pipe. In such brake control systems, the brake pipe is the conduit through which the brake commands are carried to all the vehicles in the train.

An example of such a brake pipe controlled system is the PT-2000 Brake Control System produced by the Westinghouse Air Brake Technologies Corporation (WABTEC). Based on the 26-C Style approach, the PT-2000 Brake Control System employs, in addition to the brake pipe, an electrical trainline along which brake command signals are conveyed to the brake equipment on the trucks of each railcar. Akin to the brake pipe, the conduit in which the electrical trainline is housed actually constitutes a series of individual conduits. One such conduit secured to the underside of each railcar interconnects to another such conduit via a connector between each vehicle. The brake equipment on each truck applies or releases the brakes according to the dictates of the particular brake command signal received from the central controller.

Each railcar typically includes two trucks, with each truck having its own electronic control unit. The electronic control unit receives the brake command signal sent by the central controller in the locomotive. It does so directly via the electrical trainline and/or indirectly via the brake pipe with the aid of one or more pressure transducers. In response to the brake command signal and to various other inputs specific to its own truck, the electronic control unit controls the electropneumatic brake equipment of its truck independently of the other truck.

On a passenger train equipped with a PT-2000 Brake Control System, the electronic control unit takes the form of a Communication Based Electronic Control Unit (CBECU), which is part of a communications network on the train. The electropneumatic brake equipment onboard each truck includes a truck control valve (TCV), the construction and operation of which are well known in the brake control art. The CBECU on each truck receives the brake command signal and various other signals in response to which it directly controls the TCV on the truck according to principles well known in the brake control art.

The TCV has an electropneumatic portion and a relay valve portion. The relay valve portion features a control port to which the flow of air from a source of pressure, such as the MR pipe, is controlled by the electropneumatic portion. The relay valve portion also features a supply port that connects to a source of pressurized air, an output port from which air at the supply port can be directed to the brake cylinder of the truck, and an exhaust port from which to vent the brake cylinder to atmosphere. From its output port, the relay valve portion delivers to the brake cylinder air whose pressure is proportional to the pressure impinging on its control port, though in a much greater capacity. When pressurized, the brake cylinder converts the pressurized air that it receives to mechanical force. This mechanical force is transmitted by mechanical linkage to the brake shoes. Forced against the wheels and/or disc brakes, the brake shoes are used to slow or stop the rotation of the wheels. The magnitude of the braking force applied to the wheels is directly proportional to the pressure built up in the brake cylinder.

During normal operation, the CBECU controls the electropneumatic portion of the TCV. Using the brake command and various other known inputs, the CBECU formulates the final signals with which it controls known valves within the electropneumatic portion. Using such signals according to known algorithms, the CBECU enables the electropneumatic portion to control whether, and how much, air from the MR pipe will reach the control port of the relay valve portion. The CBECU therefore enables the electropneumatic portion to control how much air will be delivered to the brake cylinder and thus the extent to which the brakes on the truck will apply. In doing so, it can not only perform various desired functions such as wheel slip control but also electronically compensate for the load borne by the truck during both service and emergency brake applications.

Whenever there is a loss of power or other electrical failure, however, the CBECU loses its ability to control the electropneumatic portion of the TCV. This causes the TCV to connect the control port of its relay valve portion directly to the source of pressure (e.g., the MR pipe) during a brake application. Because a TCV acts merely as a relay valve whenever its power is lost, the TCV will provide to the brake cylinder the same pressure it receives at its control port, but in a higher capacity. Consequently, whenever a power failure occurs, the TCV loses its ability to compensate for the load borne by the truck during both service and emergency brake applications.

For passenger transit trains, it is particularly desirable to compensate for load in determining the force with which the brakes should apply. On transit trains whose railcars employ load compensation techniques, the problems typically associated with wide variances in weight, such as elevated buff (compressive) and draft (tensive) forces among railcars, are reduced considerably.

Brake pipe controlled brake control systems have traditionally required a considerable amount of devices to perform load compensation. In 26-C Style passenger trains, the following devices were required at the very least: 26-C Style brake control valves, multiple diaphragm relay valves, small capacity transfer valves, double check valves, bypass limiting valves, and standard variable load valves. Some of these devices impose certain operational disadvantages. Multiple diaphragm relay valves, for example, tend to fix pressure ratios (i.e., pressure at full service versus that during an emergency) to a very limited number of combinations. These devices are also quite heavy, occupy a considerable amount of space, and taken together, constitute a rather complex way of performing load compensation.

It would therefore be desirable to devise a simplified system of providing load compensation for the railcars of a brake pipe controlled passenger train, especially one capable of doing so whenever a loss of power or other electrical failure occurs. It would be particularly desirable if such a system could provide load compensation during both service and emergency brake applications. Such a simplified system would ideally be installed on railcars of the type equipped with PT-2000 brake equipment. Current railcars, particularly those equipped with 26-C Style brake equipment, lack such a simplified system of compensating for load.

OBJECTIVES OF THE INVENTION

It is, therefore, an objective of the invention to provide a load compensation system that will compensate for the load a railcar bears during both service and emergency brake applications whenever a loss of power or other electrical failure occurs.

Another objective is to provide a load compensation system that is simpler in design, lighter in weight, fewer in parts, and smaller in size than prior art load compensation schemes.

A further objective is to provide a load compensation system that employs a four-port variable load valve on a railcar equipped with simplified brake pipe control valve technology.

Yet another objective is to provide a simplified load compensation system that serves as a pneumatic backup, whenever a power failure occurs, to the electronic load compensation system on a railcar equipped with brake pipe controlled brake equipment.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the drawings and claims presented herein.

SUMMARY OF THE INVENTION

The foregoing objectives and advantages are attained by a simplified pneumatic backup system. It is designed to backup pneumatically an electronic system that normally provides load compensation on a railcar truck during both service and emergency applications of the brakes. The truck is of the type equipped with brake pipe controlled brake equipment including an MR pipe, a brake pipe, and a TCV. In its most basic form, the backup system comprises a variable load valve, a main relay valve, a main control valve, and a main transfer valve. The variable load valve has supply and control ports, both in communication with a distribution network. It also has a load weigh port for receiving pressure indicative of load borne by the railcar and an emergency port for receiving pressure via an emergency network. From its output port, the variable load valve provides (I) a first load compensated pressure in response to pressure at its control and load weigh ports and (II) a second load compensated pressure in response to pressure at its control, load weigh and emergency ports. The main relay valve has a supply port linked to the MR pipe and a control port connected to the output port of the variable load valve. From its output port, the main relay valve provides an output pressure proportional to the pressure acting on its control port. The main control valve includes an emergency valve and a 3-way valve. The emergency valve vents the emergency network as long as the brake pipe pressure stays above an emergency level, below which the emergency valve links the distribution and emergency networks. The 3-way valve includes a first pilot port in communication with the brake pipe and a second pilot port communicating with a control reservoir. The main transfer valve operates in a piloted state or an unpiloted state. In the piloted state, the transfer valve disconnects the TCV from the output port of the main relay valve and links the TCV to the MR pipe thereby placing the main control valve in a cut-out mode. In the unpiloted state, the transfer valve links the TCV to the output port of the main relay valve thereby placing the main control valve in a cut-in mode wherein the 3-way valve responds by assuming one of three states. In response to the brake pipe pressure increasing relative to the pressure in the control reservoir, the 3-way valve assumes the release state wherein it exhausts the supply and control ports of the variable load valve and thus prevents the main relay valve from outputting an output pressure. In response to the brake pipe pressure dropping relative to the pressure in the control reservoir yet remaining above the emergency level, the 3-way valve assumes the service state. In this state, the 3-way valve links the MR pipe with the distribution network thereby allowing pressure to build against the supply and control ports of the variable load valve. The variable load valve responds by outputting the first load compensated pressure. This causes the main relay valve to output to the TCV an output pressure proportional to the first load compensated pressure. In the emergency state, the 3-way valve continues operating according to the service state yet the brake pipe pressure falls below the emergency level. This causes the emergency valve to link the emergency network with the distribution network thereby allowing pressure from the MR pipe to build against the emergency port. The variable load valve responds by outputting the second load compensated pressure. This causes the main relay valve to output to the TCV an output pressure proportional to the second load compensated pressure.

DETAILED DESCRIPTION OF THE INVENTION

Before describing the invention in detail, the reader is advised that identical components having identical functions have been marked, where possible, with the same reference numerals in each of the accompanying Figures. This has been done for the sake of clarity and to improve understanding of the invention.

The invention is described in the following text as if incorporated into the PT-2000 brake equipment for a passenger transit railcar. Despite being described in this context, it should be apparent that the invention may be incorporated into other types of vehicles on which the brake equipment may be configured differently from what is described in this document. The invention is presented is in this context not to limit its scope but merely to simplify the description, and consequently the understanding, of the invention.

Figure 1A:
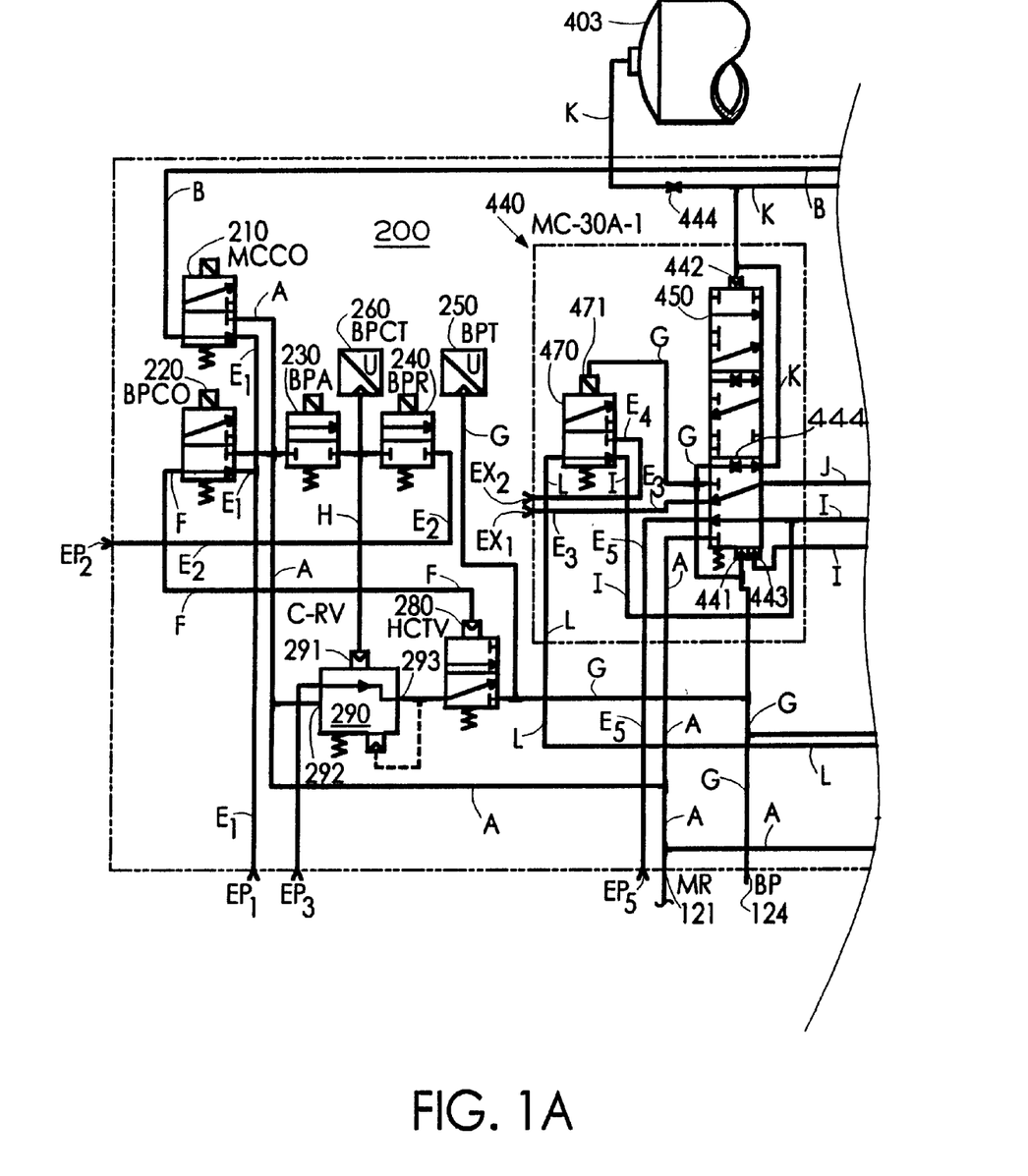
FIGS. 1A and 1B is a schematic diagram showing the invention incorporated as part of a Brake Pipe Transitional Unit, the latter being designed for a brake pipe controlled brake control system.
Figure 1B:
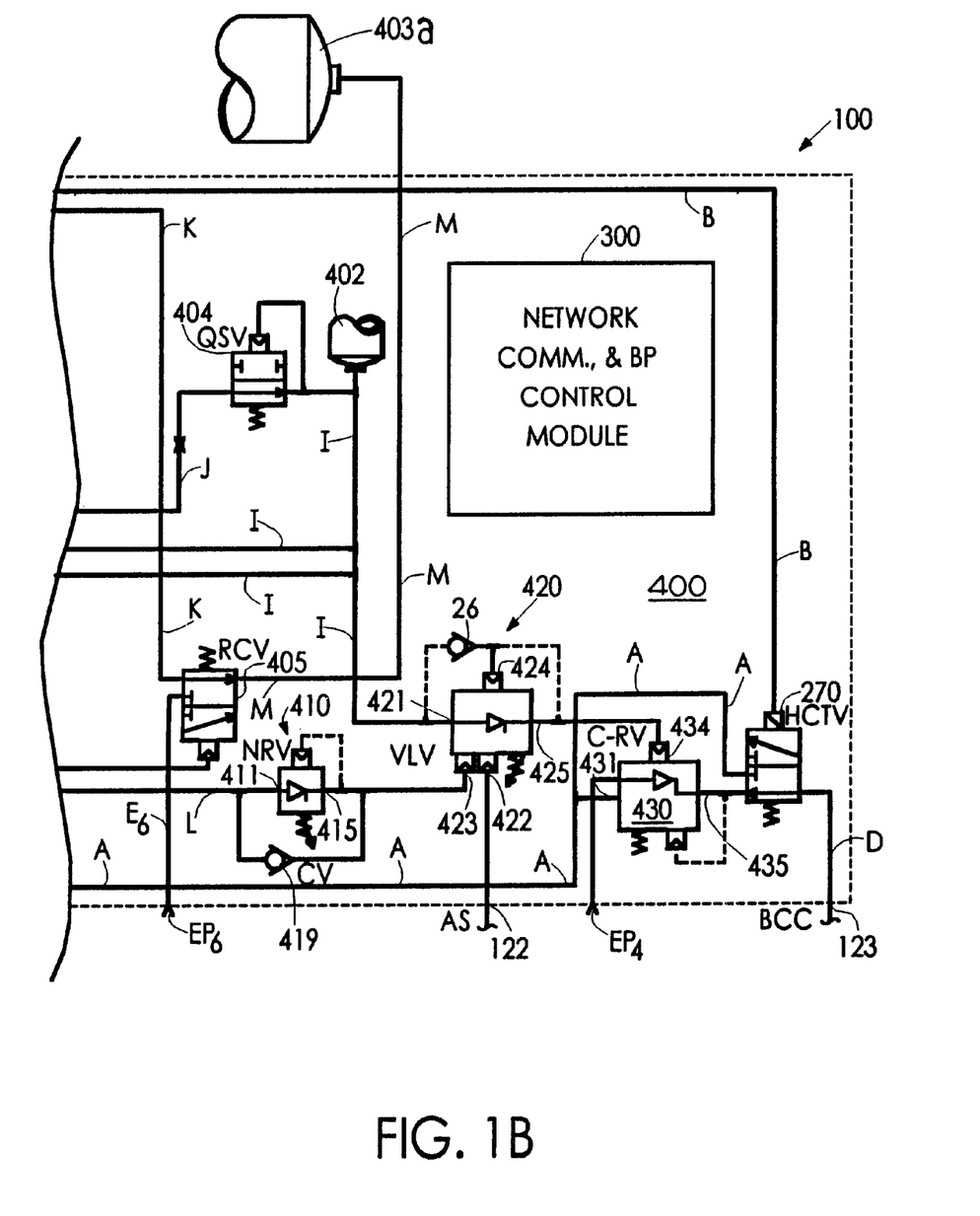

FIG. 1 illustrates the invention as incorporated into a Brake Pipe (BP) Transitional Unit, generally designated 100. The BP transitional unit 100 is designed to control the braking on two trucks of a railcar. On a railcar equipped with 26-C Style brake equipment, for example, the BP transitional unit 100 pneumatically links to the brake equipment through several ports. Its input ports include a relay valve (RCV) supply port 121 and an air suspension (AS) port 122. It also has a brake cylinder control (BCC) port 123, six exhaust ports $EP_1$ through $EP_6$, and a brake pipe (BP) port 124. RCV supply port 121 receives air from a first source of pressure, such as the MR pipe. AS port 122 receives pressure from a load sensing system (not shown) on the vehicle. As is well known in the transit industry, the air spring pressure output by such a load sensing system can be used to provide AS port 122 with a pressure indicative of the load borne by the railcar. BP port 124 connects to the brake pipe whereas BCC port 123 serves as the source of pressure for the control port of the relay valve portion of the TCV. In this configuration, the CBECU will be able to control the electropneumatic portion of the TCV, as long as no power failure occurs. This enables the electropneumatic portion, during normal operation, to control whether, and how much, air from BCC port 123 will reach the control port of the relay valve portion. As noted above, however, the electropneumatic portion will connect BCC port 123 to the control port of the relay valve portion of the TCV whenever an electrical failure or loss of power occurs.

BP transitional unit 100 basically comprises an electropneumatic section 200, an electronics section 300 and a load compensation section 400. The electropneumatic section 200 includes an MC cutout (MCCO) valve 210, a brake pipe cutout (BPCO) valve 220, a brake pipe application (BPA) valve 230 and a brake pipe release (BPR) valve 240, all of which being two state valves. It also includes a brake pipe transducer (BPT) 250, a brake pipe control transducer (BPCT) 260, two high capacity transfer valves (HCTV) 270 and 280, and a C-type relay valve (C-RV) 290. BPT 250 generates an electrical signal indicative of the pressure in the brake pipe. BPCT 260 generates a signal indicative of the pressure acting against the control port 291 of C-RV 290.

The electronics section 300 is used to direct the operation of the electropneumatic valves, namely, MCCO valve 210, BPCO valve 220, BPA valve 230, and BPR valve 240. It also receives feedback from the two transducers, BPT 250 and BPCT 260. On a railcar equipped with PT-2000 brake equipment, for example, the electronics section 300 will be controlled by the CBECU. Using the brake command signal and the feedback from transducers 250 and 260 as well as other inputs, the CBECU shall command the electronics section 300 to selectively energize or deenergize the primary and secondary cutout valves 210 and 220, respectively, and the BPA and BPR valves 230 and 240.

Upon a loss of power to or other failure of this electronic controller 300, the load compensation section 400 will compensate for the load the railcar bears during both service and emergency applications of the brakes on the truck. Until such failure, the electronic controller 300 will not only bypass or cut-out the load compensation section 400 via MCCO valve 210 but also electropneumatically control the charging and discharging of the brake pipe via BPCO, BPA and BPR valves 220, 230 and 240.

I. BPCO VALVE (ENABLES OR DISABLES CONTROL OF BRAKE PIPE)

During normal operation, the electronic controller 300 controls the operation of BPCO valve 220 and thereby enables or disables electropneumatic control of the brake pipe. When energized to the cut-in state, the BPCO valve 220 enables the pressure in the brake pipe to be controlled via the BPA and BPR valves 230 and 240. Specifically, as long as it keeps BPCO valve 220 energized, the electronics section 300 is able to control the BPA and BPR valves and thereby control the pressure in the brake pipe via C-RV 290. When BPCO valve 220 is deenergized, however, BPCO valve 220 automatically assumes the cut-out state. In the cut-out state, BPCO valve 220 cuts the brake pipe off from the control of the BPA and BPR valves 230 and 240.

A. BPCO VALVE ENERGIZED (ENABLES CHARGING OF BRAKE PIPE)

In its energized or cut-in state, BPCO valve 220 disconnects passage networks $E_1$ and F and thereby disconnects the pilot port of the second transfer valve, HCTV 280, from the exhaust port $EP_1$. It also interconnects the pilot port of HCTV 280 to the MR pipe via passage networks A and F. HCTV 280 responds to the pilot pressure by pneumatically switching itself to the open state wherein it links the output port 293 of C-RV 290 to the brake pipe via passage network G. Whether or not C-RV 290 actually pressurizes the brake pipe with air from the MR pipe depends on the state of the BPA and BPR valves 230 and 240. This is because the BPA and BPR valves affect the pressure that impinges upon the control port 291 of C-RV 290.

1. BPA DEENERGIZED AND BPR ENERGIZED (BP NOT CHARGING)

With BPCO valve 220 in the cut-in state, the BPA and BPR valves can be used to control the pressure developed at the control port 291 and thus the operation of C-RV valve 290. When BPA valve 230 is in its normally closed (i.e., deenergized) state and BPR valve 240 is in its open (i.e., energized) state, the control port 291 of C-RV 290 is vented to atmosphere via passage networks H and $E_2$ and the exhaust port $EP_2$. C-RV 290 responds to the lack of control pressure by internally cutting off communication between its supply and output ports 292 and 293. Under such conditions, C-RV 290 prevents air in the MR pipe from flowing to the brake pipe via HCTV 280 and networks A and G.

2. BPA ENERGIZED AND BPR DEENERGIZED (BP CHARGES)

When BPA valve 230 is in its open (i.e., energized) state and BPR valve 240 is in its normally closed (i.e., deenergized) state, air from the MR pipe is allowed to flow to the control port 291 of C-RV 290 via passage network A and H. Once the requisite control pressure builds at its control port 291, C-RV 290 responds by internally linking its supply and output ports 292 and 293. C-RV 290 thereby allows air from the MR pipe to pressurize the brake pipe through passage networks A and G via HCTV 280. The effect that this rise in brake pipe pressure has on the load compensation section 400 is described below for a brake release command.

3. BPA AND BPR BOTH DEENERGIZED (BP IN LAP STATE)

When the BPA and BPR valves are both commanded to their normally closed states, the control port 291 of C-RV 290 is cut off not only from the MR pipe via network A but also from the atmosphere via exhaust port $EP_2$ and exhaust network $E_2$. Under these conditions, C-RV 290 will assume a lap state wherein the pressure at the control port 291 is held constant. This causes C-RV 290 to hold the pressure in the brake pipe to a level that corresponds to the pressure impinging upon its control port 291.

B. BPCO VALVE DEENERGERIZED (DISABLES CHARGING OF BRAKE PIPE)

In its deenergized or cut-out state, BPCO valve 220 interconnects networks $E_1$ and F and thereby interconnects the pilot port of HCTV 280 to exhaust port $EP_1$. Without the requisite pressure acting on its pilot port, the second transfer valve 280 assumes the closed state. In this state, HCTV 280 disconnects the output port 293 of C-RV 290 from passage network G and, more significantly, from the brake pipe to which network G connects. Consequently, regardless of the state of C-RV 290, air from the MR pipe is prevented from flowing via network A to the brake pipe via network G. The opening of HCTV 280 bypasses or prevents electropneumatic control of the pressure within the brake pipe.

Taken together, the electropneumatic valves 220, 230 and 240, the pneumatic valves 280 and 290, and the pressure transducers 250 and 260 may essentially be considered as a means of electrically controlling the pressure in the brake pipe. It should be understood that this control means could, of course, be implemented using various other techniques and devices known to persons skilled in the brake control art.

II. MCCO VALVE (DISABLES OR ENABLES LOAD COMPENSATION)

During normal operation, the electronic controller 300 controls the operation of MCCO valve 210 and thereby enables or disables the load compensation section 400 of BP transitional unit 100. When energized to the cut-out state, MCCO valve 210 cuts out or bypasses the load compensation section 400. In this state, MCCO valve 210 simply prevents the load compensation section 400 from controlling the flow of air ultimately output from BCC port 123. When deenergized, however, MCCO valve 210 assumes the cut-in state wherein the load compensation section 400 is permitted to control the output from BCC port 123 and thus to compensate for the load borne by the railcar during both service and emergency brake applications. In the environment for which this invention is described, however, the load compensation section 400 will be cut-in only when an electrical failure occurs. It is envisioned as a pneumatic backup to the electronic system that normally provides load compensation on the railcar during both service and emergency applications of the brakes.

A. MCCO VALVE ENERGIZED (LOAD COMPENSATION CUT-OUT)

BP transitional unit 100 operates in what can be referred to as a load compensation (LC) cut-out mode when its MCCO valve 210 is energized to the cut-out state. In this state, MCCO valve 210 interconnects passage networks A and B and thereby allows air from the MR pipe to flow to the pilot port of the main transfer valve, HCTV 270. HCTV 270 responds to the pilot pressure by disconnecting the output port 435 of C-RV 430 from network D, thereby cutting the load compensation section 400 off from BCC port 123. In doing so, HCTV 270 has pneumatically switched itself to the bypass state wherein air from the MR pipe is allowed to flow via networks A and D and HCTV 270 to BCC port 123.

Because the load compensation section 400 has been forced into the LC cut-out mode, the MR pipe will serve as the source of pressure for the control port of the relay valve portion of the TCV. Because no electrical failure has occurred, the CBECU maintains electronic control over the electropneumatic portion of the TCV. Through the electropneumatic portion, the CBECU thus maintains control as to how much, if any, air from BCC port 123 will reach the control port of the relay valve portion of the TCV. In doing so, the CBECU will employ standard prior art techniques in electronically compensating for the load borne by the truck during both service and emergency brake applications.

B. MCCO VALVE DEENERGIZED (LOAD COMPENSATION CUT-IN)

BP transitional unit 100 operates in what can be referred to as the LC cut-in mode when its MCCO valve 210 is deenergized to the cut-in state. In this state, MCCO valve 210 disconnects networks A and B and thereby prevents air in the MR pipe from flowing to and acting against the pilot port of HCTV 270. MCCO valve 270 actually links the pilot port to the exhaust port $EP_1$ via networks B and $E_1$. In its unpiloted state, HCTV 270 interconnects the output port 435 of C-RV 430 to BCC port 123 via network D. The load compensation section 400 thus assumes sole control over how much, if any, pressure will be provided to BCC port 123.

Load compensation section 400 will typically be allowed to assume the LC cut-in mode only when an electrical failure occurs. In this scenario, it will serve as the only source of pressure for the control port of the relay valve portion of the TCV. As noted above, the CBECU loses its ability to control the electropneumatic portion of the TCV during an electrical failure. This causes the TCV to connect the control port of its relay valve portion directly to BCC port 123 during a brake application. Because it acts as a relay valve whenever it loses power, the TCV will provide to the brake cylinder the same pressure it receives at its control port, but in a higher capacity. Consequently, whenever a power failure occurs, only load compensation section 400 can provide load compensation for the truck during service and emergency brake applications. The specifics as to how the load compensation section 400 pneumatically compensates for load is explained in detail below.

III. LOAD COMPENSATION SECTION: DESCRIPTION

The invention primarily resides in load compensation section 400, which is composed entirely of pneumatically operated components. Load compensation section 400 includes a displacement volume 402, a control reservoir 403, a selector volume 403a, a quick service valve (QSV) 404, a release control valve (RCV) 405, an N-Style reducing valve (NRV) 410 with check valve 419, a four-port variable load valve (VLV) 420, a C-type relay valve (C-RV) 430, and a MC-30A-1 control valve 440. Volume 402 serves as a buffer against sharp increases and decreases in pressure.

Figure 2:
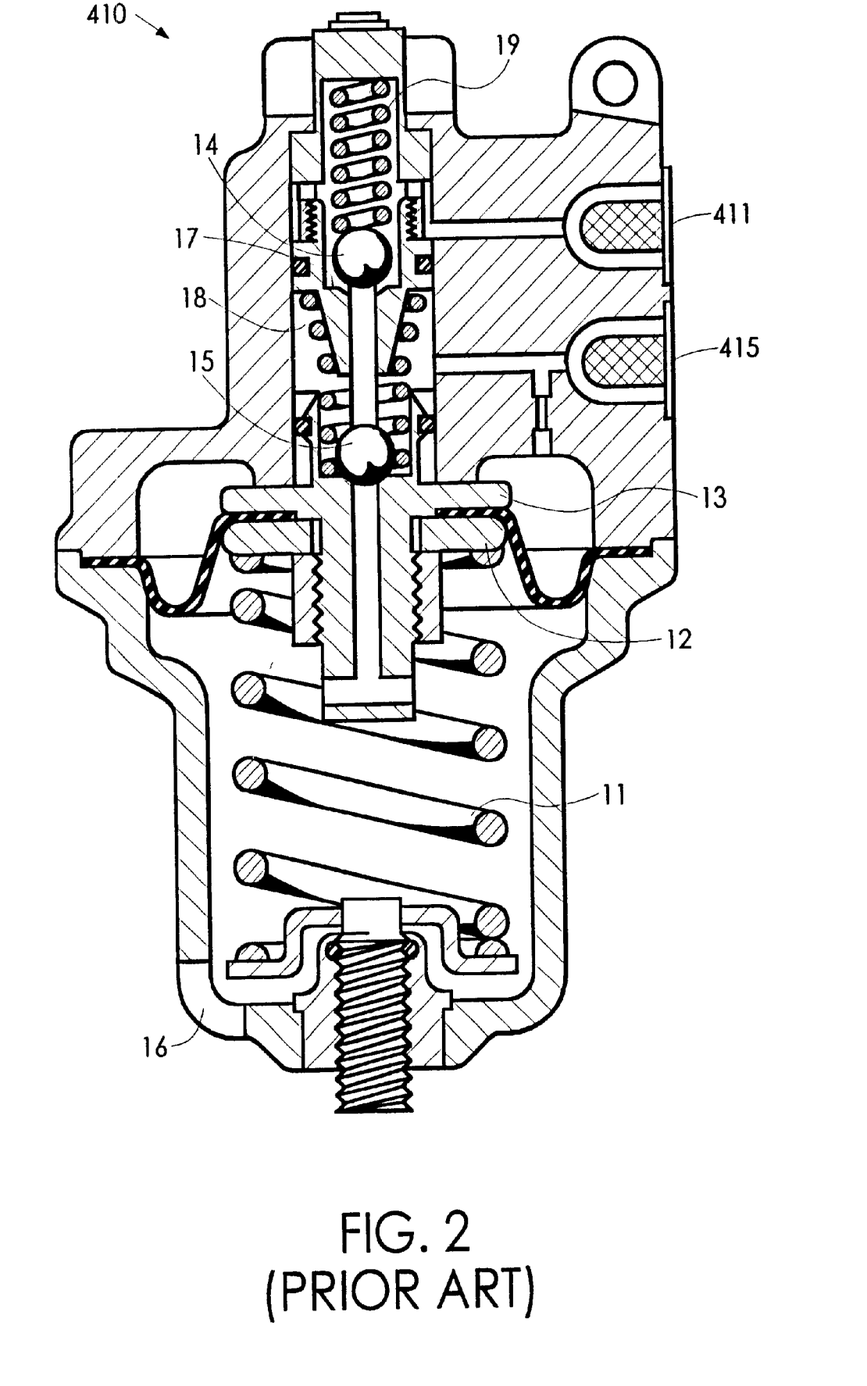
FIG. 2 is a cross-sectional view of a prior art N-Style reducing valve, which is part of the invention shown in FIG. 1.

NRV 410 is a self-lapping regulating valve whose construction and operation are well known in the railroad industry. An example of such a regulating valve is shown and described in Operation & Maintenance Publication 4209-03 PTD published by WABTEC and incorporated herein by reference. Shown in FIG. 2, NRV 410 includes a control spring 11, a diaphragm assembly 12 and its associated valve seat 13, a dumbbell type valve unit having inlet and exhaust valves 14 and 15, an exhaust port 16, an inlet port 411, and outlet port 415. Inlet port 411 connects to a source of pressurized air, namely, network L. Control spring 11 normally biases valve seat 13 against exhaust valve 15 and keeps inlet valve 14 off its own seat 17. Air entering inlet port 411 can then flow past inlet valve 14 through chamber 18 to outlet port 415 and to the face of diaphragm 12, forcing diaphragm assembly 12 downward and compressing control spring 11. When this output pressure acting on diaphragm 12 equals the force of control spring 11, the dumbbell unit moves downward at the urging of spring 19 to close inlet valve 14 against seat 17. NRV 410 thus assumes a lap position, as both the inlet and exhaust valves 14 and 15 are closed. Should the output pressure drop, control spring 11 will again force the dumbbell unit upward against spring 19 to reopen inlet valve 14. Once the output pressure increases to again match the force of control spring 11, NRV 410 reassumes the lap position. Should the output pressure rise above that necessary to match the force of control spring 11, diaphragm assembly 12 will move downward against control spring 11 to open exhaust valve 15. Once the output pressure falls to the level where it matches the force of control spring 11, NRV 410 again assumes the lap position. In this manner, NRV 410 delivers from its outlet port 415 a constant pressure that is lower than the pressure it received at its inlet port 411. Moreover, by adjusting the position of the biasing screw, the upward force exerted by control spring 11 on diaphragm assembly 12 may be altered. In doing so, the output pressure deliverable by NRV 410 may be set to a predetermined level.

VLV 420 is a four-port air-piloted device whose construction and operation are well known in the brake control art. An example of such a variable load valve is the XB-1 type shown and described in Operation & Maintenance Publication 4229-1, S.29, published by WABTEC and incorporated herein by reference. Shown in FIG. 3, VLV 420 has a supply port 421, a load weigh port 422, an emergency port 423, and an output port 425. Load weigh port 422 connects to the load sensing system via AS port 122 from which it receives the air spring pressure indicative of the load borne by the vehicle. As disclosed in detail below, emergency port 423 is used to receive air pressure during an emergency brake application. In the context of the invention, air pressure from the load sensing system is conveyed via load weigh port 422 to chamber 20 wherein it acts upwardly against the lower step of step piston 21. The force of lower spring 22 also acts to bias step piston 21 upward. By virtue of the air spring pressure and lower spring 22, step piston 21 via plunger 23 normally keeps small piston 24 unseated, overcoming the opposing force of upper spring 25. Supply and output ports 421 and 425 are therefore normally interconnected, and thus air from the supply port 421 is normally allowed to reach chamber 26. When the combined downward force of spring 25 and the pressure in chamber 26 reaches or exceeds the combined upward force of lower spring 22 and the pressure in chamber 20 (load weigh port 422) step piston 21 will move downward and thereby cause small piston 24 to seat. This cuts off the flow of air between the supply and output ports 421 and 425. The air spring pressure at load weigh port 422 thus determines the maximum pressure that VLV 420 will be able to output from its output port 425 during a service application of the brakes.

Figure 3:
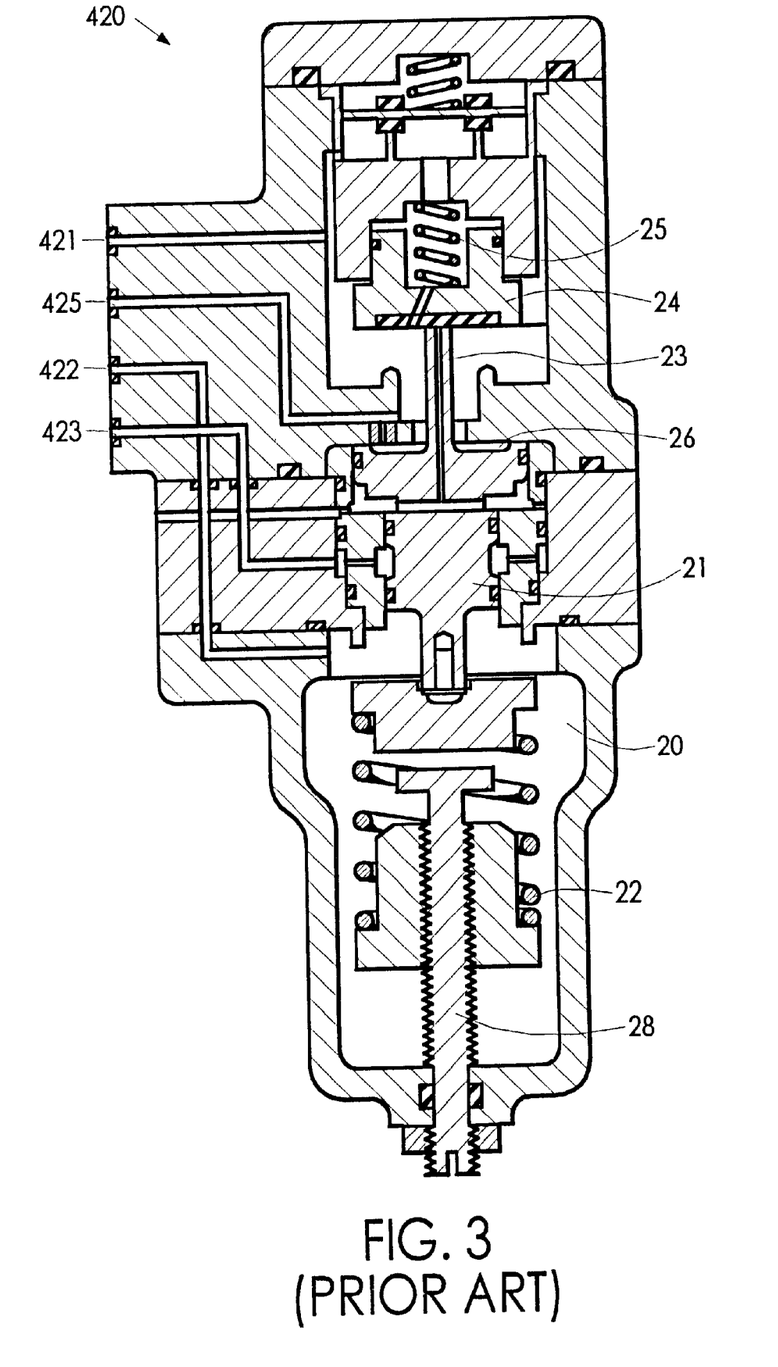
FIG. 3 is a cross-sectional view of a prior art variable load valve, which is part of the invention shown in FIG. 1.

During an emergency application of the brakes, however, air will be also supplied to the emergency port 423, as disclosed below. This emergency pressure will be conveyed to the middle step of step piston 21 where it combines with the upward force acting against step piston 21 due to spring 22 and the air spring pressure. The emergency pressure thus increases the amount of supply pressure that must be applied to chamber 26 to move small piston 24 downward against its seat and thereby cut off the flow of air between the supply and output ports 421 and 425. VLV 420 will thus provide a higher output pressure during an emergency application of the brakes than it will during a service application. Moreover, by adjusting the position of biasing screw 28, the upward force exerted by lower spring 22 on step piston 21 may be altered. In doing so, the maximum allowable pressure output by VLV 420 may be set to a desired level.

C-type relay valve (C-RV) 430 is an air-piloted device whose construction and operation are also well known. C-RV 430 is the main relay valve of the invention. An example of such a relay valve is the C-2-W type shown and described in Operation & Maintenance Publication 4208-50, S.2, published by WABTEC and incorporated herein by reference. Although a C-2-W type relay valve may also be used for the second relay valve 290, the C-2-W type relay valve is described here only in the context of C-RV 430 for the sake of brevity.

C-RV 430 features a supply port 431, a control port 434, and an output port 435. As disclosed below, the support port 431 is connected to a source of pressurized air. Relay valve 430 responds to pressure at its control port 434 by internally interconnecting its supply and output ports 431 and 435. From its output port 435, C-RV 430 provides air whose pressure is proportional to the pressure that impinges upon its control port 434. C-RV 430, however, delivers air from its output port 435 in much greater capacity than that acting upon its control port 434.

Figure 4:
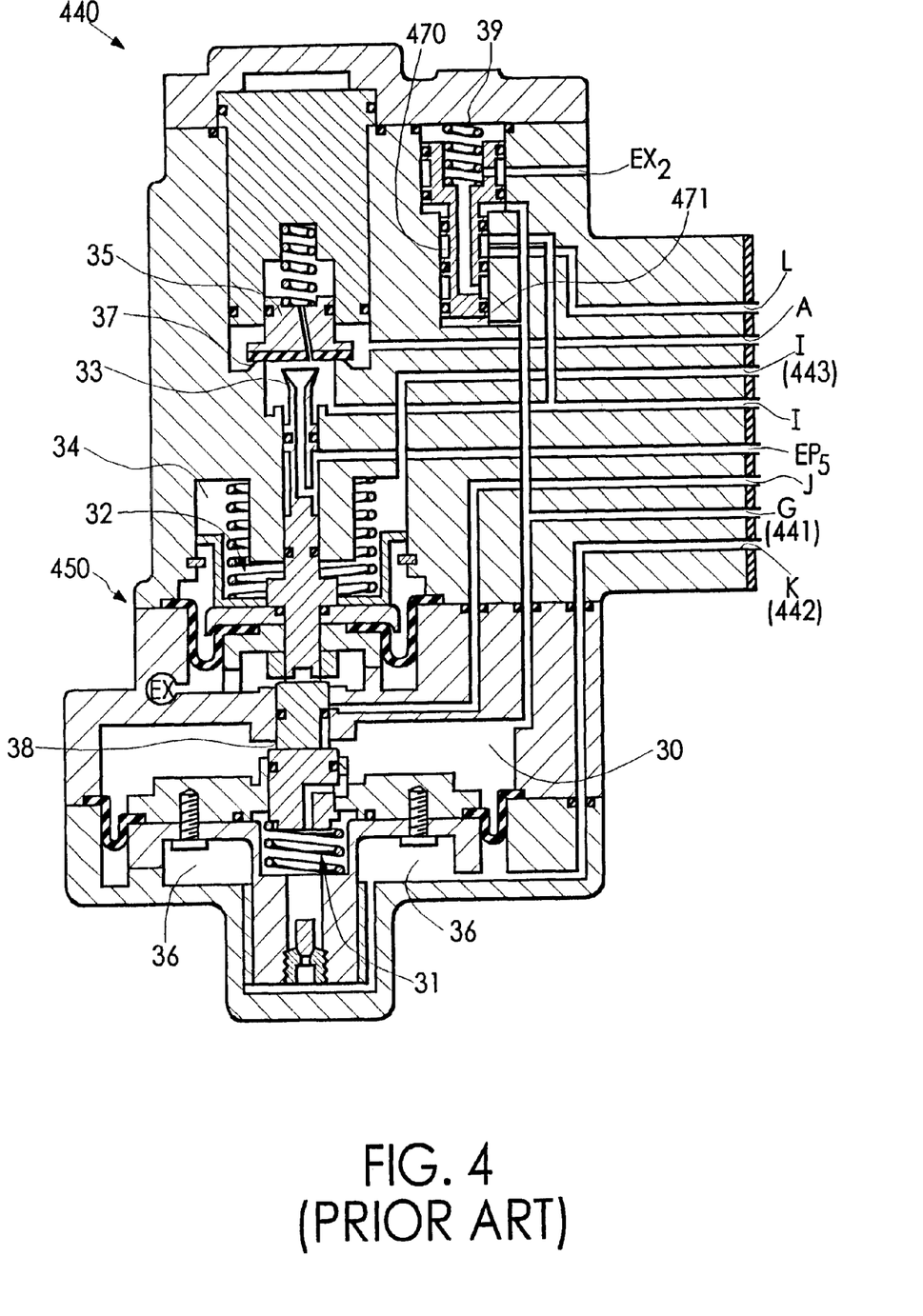
FIG. 4 is a cross-sectional view of a prior art MC-30A-1 control valve, which is part of the invention shown in FIG. 1.

MC-30A-1 control valve 440 is an air-operated device whose construction and operation are well known in the brake control art. It is shown and described in Operation & Maintenance Publication 4220-5, S.34, published by WABTEC, which is incorporated into this document by reference. Shown in FIG. 4, the MC-30A-1 control valve 440 is the main control valve in the invention. It includes a 3-way valve 450, an emergency valve 470, and two exhaust ports $EX_1$ and $EX_2$. The operation of 3-way valve 450 depends on the difference in pressure applied to its two pilot ports. Referring to FIGS. 1 and 4, the first pilot port 441 receives pressure from the brake pipe via BP port 124 and network G, and the second pilot port 442 receives pressure from control reservoir 403 via network K. Emergency valve 470 is an air-piloted valve whose operation depends on the pressure applied to its own pilot port 471. Pilot port 471 is linked to the brake pipe via BP port 124 and network G. The operation of the main control valve is described below in the context of the invention.

IV. LOAD COMPENSATION SECTION: OPERATION

Whenever there is a loss of power or other electrical failure, the electronics section 300 loses its ability to keep MCCO valve 210 energized. As long as it stays in the cut-in state, MCCO valve 210 enables the MC-30A-1 control valve 440 to respond to whatever changes in pressure occur within the brake pipe. It responds to such changes by ultimately affecting the pressure output from BCC port 123. Depending on the difference between the pressure acting on first pilot port 441 and that acting on second pilot port 442, the control valve 440 may assume any one of three states: release, service, and emergency.

A. CONTROL VALVE SWITCHED TO RELEASE STATE

When the central controller commands an increase in brake pipe pressure to release the brakes, the MC-30A-1 control valve 440 will soon assume the release state. More specifically, 3-way valve 450 will move to a release position when the pressure at the first pilot port 441 exceeds that acting against the second pilot port 442. This occurs, of course, when the pressure in the brake pipe exceeds the pressure in the control reservoir 403.

FIG. 4 shows the internal structure of the MC-30A-1 control valve 440, and is instructive about how the 3-way valve 450 responds to the increase in brake pipe pressure. As the brake pipe pressure rises, air flows via network G to chamber 30 on the left side of charging and dissipation valve 31. The increase in pressure in chamber 30 enables valve stack 32 to move rightward, causing exhaust valve 33 to unseat. This allows the distribution network I to exhaust to atmosphere via exhaust port $EP_5$. It also causes the pressure to drop in chamber 34 accordingly. Once the pressure in chamber 34 drops sufficiently, the exhaust valve 33 will again seat against service valve 35. When the pressure in chamber 30 reaches a value within a few pounds (psi) of that in chamber 36, the charging and dissipation valve 31 opens. This connects chambers 30 and 36 and thus interconnects the brake pipe and the control reservoir 403 via networks G and K. Exhaust valve 33 meanwhile remains open, leaving the distribution network I open to atmosphere via exhaust port $EP_5$.

FIG. 1 shows the larger picture. As the pressure builds in the brake pipe, the pressure also builds via network G against the pilot port 471 of emergency valve 470 and the pilot port of RCV 405. Starting with an empty brake pipe, as soon as the pressure at pilot port 471 reaches or exceeds the emergency level, the emergency valve 470 will respond by linking emergency network L and exhaust network $E_4$. This allows the emergency network L to vent to atmosphere via exhaust port $EX_2$ and thereby purges any pressure that may have been acting against the emergency port 423 of VLV 420 via NRV 410 and check valve 419. The lack of pressure acting on emergency port 423 confirms to VLV 420 that no emergency brake application has been requested.

Responding to the increasing pressure at its first pilot port 441, the 3-way valve 450 assumes the release position. In the release position, the 3-way valve 450 establishes communication not only between passage networks $E_5$ and I but also between networks $E_3$ and J. The link between networks $E_5$ and I allows air previously stored in displacement volume 402 and any air acting against the pilot port of QSV 404 to vent to atmosphere via exhaust port $EP_5$. When pressure at its pilot port falls below the trigger level, QSV 404 assumes the open state thereby establishing communication between networks I and J. This hastens the venting of passage network I, via networks J and $E_3$ and exhaust port $EX_1$.

Next, once its pilot pressure reaches or exceeds the threshold level, RCV 405 will respond by disconnecting networks M and K and interconnecting networks M and $E_6$. This allows the selector volume 403a to exhaust to atmosphere via network M and exhaust port $EP_6$. Meanwhile, air from the brake pipe also pressurizes control reservoir 403 via interconnected networks G and K and a choke 444. Furthermore, the link between networks $E_5$ and I also allows any air acting against the supply and control ports 421 and 424 of VLV 420 to vent to atmosphere via exhaust port $EP_5$. VLV 420 thus conveys no air through its supply and output ports 421 and 425 to control port 434. C-RV 430 responds to the lack of control pressure by internally cutting off communication between its supply and output ports 431 and 435. Under such conditions, C-RV 430 prevents air in the MR pipe from flowing to BCC port 123 via the unpiloted HCTV 270 and network D. Although the load compensation section 400 is enabled due to deenergization of MCCO valve 210, it will not allow pressurized air to be output from BCC port 123 whenever the brake pipe is pressurized (i.e., carrying a brake release command).

B. CONTROL VALVE SWITCHED TO SERVICE STATE

When the central controller commands a decrease in brake pipe pressure to make a service application of the brakes, the MC-30A-1 control valve 440 will soon assume the service state. More specifically, 3-way valve 450 will move to a service position when the pressure at the first pilot port 441 falls relative to that currently acting upon the second pilot port 442. This difference in pressure is, of course, indicative of the drop in pressure in the brake pipe relative to that in the control reservoir 403.

Referring to FIGS. 1 and 4, as the brake pipe pressure drops, air flows via network G out of chamber 30 to the brake pipe. This drop in pressure in chamber 30 initially closes the charging and dissipation valve 31 and thereby cuts off chamber 30 from chamber 36. This disconnects networks K and G and thereby isolates the control reservoir 403 from the brake pipe. Once the brake pipe pressure drops below the threshold level, RCV 405 responds by disconnecting networks M and $E_6$ and interconnecting networks M and K. This links the selector volume 403a to the control reservoir 403. The decrease in brake pipe pressure soon forces the charging and dissipation valve 31 to move the valve stack 32 leftward to interconnect dispersal network J with network G via chamber 30. This allows the brake pipe and chamber 30 to vent locally past quick service valve 38. As brake pipe pressure continues to fall, the valve stack 32 is forced further leftward causing exhaust valve 33 not only to close but also to lift service valve 35 off seat 37. This interconnects networks A and I. The link between networks A and I allows pressurized air from the MR pipe to flow to the pilot port of QSV 404, the displacement volume 402, the supply and control ports 421 and 424 of VLV 420 and to chamber 34 inside valve 450 (i.e., to the feedback pilot port 443 of valve 450, as shown in FIG. 1). QSV 404 responds to the pressure increase at its pilot port by switching itself to the closed state thereby cutting off communication between the dispersal and distribution networks J and I. QSV 404 thus prevents air from the MR pipe in networks A and I from exhausting to the brake pipe via networks J and G.

Inside 3-way valve 450, the amount of pressure built up in chamber 34 (feedback pilot port 443) corresponds to the level to which the pressure in the brake pipe (chamber 30) drops. This correspondence enables the buildup in chamber 34 to move valve stack 32 to a lap condition in which service valve 35 returns to seat 37 yet keeps exhaust valve 33 closed. The closure of service valve 35 again disconnects network A and I. As long as service valve 35 remains closed, the MR pipe will be cutoff from network I. The pressure previously built up in network I, however, will continue to act upon the pilot port of QSV 404, the feedback pilot port 443 of valve 450 (chamber 34), the displacement volume 402, and the supply and control ports 421 and 424 of VLV 420.

The load compensation section 400 responds to further drops in pressure in much the same way, as long as the brake pipe pressure stays above the emergency level. For any given drop in brake pipe pressure, the buildup in chamber 34 will eventually move valve stack 32 to the lap condition. The pressure built up in the distribution network I just prior to the lap condition will then be acting upon the supply and control ports of VLV 420.

Supplied with pressure at both its supply and control ports, the VLV 420 is then able to operate as noted previously. The VLV 420 uses the pressure that it receives at its load weigh port 422 to limit the maximum pressure at which it directs air from its supply port 421 to its output port 425. C-RV 430 responds to the control pressure by outputting air at a pressure proportional to the pressure impinging on its control port 434. From its output port 435, C-RV 430 allows the air to flow via the unpiloted HCTV 270 and BCC port 123 to the TCV on the truck. Because the TCV acts as a relay valve whenever power is lost, the TCV delivers air to the brake cylinder at the pressure it detects at its control port, but in a higher capacity. In this manner, the load compensation section 400 compensates for the load the railcar bears in making a service brake application on the truck when an electrical failure occurs.

C. CONTROL VALVE SWITCHED TO EMERGENCY STATE

When the central controller commands a decrease in brake pipe pressure to make an emergency application of the brakes, the MC-30A-1 control valve 440 will soon assume the emergency state.

Referring still to FIGS. 1 and 4, the MC-30A-1 control valve 440 will operate in generally the same manner as that described above for a service brake application. During a service brake application, however, the brake pipe pressure normally stays above the emergency level. Viewed from the perspective of FIG. 4, the emergency level is the minimum amount of pressure required at pilot port 471 to force and keep emergency valve 470 leftward against the force of spring 39. This keeps the emergency 5 network L disconnected from the distribution network I yet linked to exhaust port $EX_2$ via exhaust network $E_4$.

During an emergency brake application, the brake pipe will vent completely. As soon as the pressure at pilot port 471 drops below the emergency level, the emergency valve 470 will respond by interconnecting networks L and I. Air from distribution network I will then flow into emergency network L and reach NRV 410 and check valve 419. Together NRV 410 and check valve 419 respond, as noted above, by providing a predetermined pressure to the emergency port 423 of VLV 420. Now receiving input at both its load weigh and emergency ports 422 and 423, VLV 420 will now react by providing a higher output pressure during this emergency brake application than it does during a service application, as described earlier.

Deployed as disclosed above, the load compensation section 400 serves as a pneumatic backup to the electronic system that normally provides load compensation on the truck during both service and emergency brake applications.

The presently preferred embodiment for carrying out the invention has been set forth in detail according to the Patent Act. Persons of ordinary skill in the art to which this invention pertains may nevertheless recognize various alternative ways of practicing the invention without departing from the spirit and scope of the following claims. Persons who possess such skill will also recognize that the foregoing description is merely illustrative and not intended to limit any of the ensuing claims to any particular narrow interpretation.

Accordingly, to promote the progress of science and the useful arts, we secure for ourselves by Letters Patent exclusive rights to all subject matter embraced by the following claims for the time prescribed by the Patent Act.

We claim:

1. A backup system for pneumatically backing up an electronic system of compensating for load in applying brakes on a railcar truck equipped with brake pipe controlled brake equipment, said brake equipment including a main reservoir pipe, a brake pipe and a truck control valve, said backup system comprising:

(a) a control reservoir;

(b) a selector volume;

(c) a displacement volume in communication with a distribution network;

(d) a quick service valve having a pilot port connected to said distribution network such that said quick service valve disconnects said distribution network and a dispersal network when pressure at said pilot port exceeds a trigger level;

(e) a release control valve having a pilot port linked to said brake pipe such that when said brake pipe pressure exceeds a threshold level said release control valve disconnects said selector volume from said control reservoir and vents said selector volume;

(f) a variable load valve having a supply port in communication with said distribution network, a control port in communication with said distribution network, a load weigh port for receiving pressure indicative of load borne by said railcar, and an emergency port for receiving pressure via an emergency network; said variable load valve providing from an output port thereof (I) a first load compensated pressure in response to pressure at said control and said load weigh ports and (II) a second load compensated pressure in response to pressure at said control, said load weigh and said emergency ports;

(g) a main relay valve having a supply port linked to said main reservoir pipe and a control port connected to said output port of said variable load valve; said main relay valve for providing from an output port thereof an output pressure proportional to the pressure acting on said control port thereof;

(h) a main control valve comprising an emergency valve and 3-way valve, said emergency valve linking said emergency network to atmosphere as long as said brake pipe pressure stays above an emergency level below which said emergency valve links said emergency and said distribution networks; said 3-way valve having a first pilot port in communication with said brake pipe and a second pilot port communicating with said control reservoir; and (i) a main transfer valve for operating in (I) a piloted state wherein said truck control valve is disconnected from said output port of said main relay valve and is linked to said main reservoir pipe thereby placing said main control valve in a cut-out mode and (II) an unpiloted state wherein said truck control valve is linked to said output port of said main relay valve thereby placing said main control valve in a cut-in mode of operation wherein said main control valve assumes one of:

(I) a release state wherein said brake pipe pressure increases relative to pressure in said control reservoir causing said 3-way valve (a) to link said brake pipe and said control reservoir thereby allowing said control reservoir to pressurize and (b) to link both said distribution and dispersal networks to atmosphere thereby exhausting said displacement volume, said pilot port of said quick service valve and said supply and said control ports of said variable load valve thus preventing said main relay valve from outputting said output pressure;

(II) a service state wherein said brake pipe pressure drops relative to pressure in said control reservoir yet remains above said emergency level causing said 3-way valve (a) to disconnect said brake pipe and said control reservoir and when said brake pipe pressure falls below said threshold level said release control valve links said control reservoir with said selector volume and (b) to link said dispersal network with said brake pipe and said main reservoir pipe with said distribution network thereby allowing pressure to build within said displacement volume and against both said pilot port of said quick service valve and said supply and said control ports of said variable load valve whereupon said quick service valve disconnects said distribution and dispersal networks to prevent pressure in said main reservoir pipe from exhausting via said brake pipe and whereupon said variable load valve outputs said first load compensated pressure thus causing said main relay valve to output to said truck control valve said output pressure proportional to said first load compensated pressure; and (III) an emergency state wherein said 3-way valve continues operating according to said service state yet said brake pipe pressure falls below said emergency level causing said emergency valve to link said emergency network with said distribution network and allow pressure from said main reservoir pipe to build against said emergency port thereby causing said variable load valve to output said second load compensated pressure thus causing said main relay valve to output to said truck control valve said output pressure proportional to said second load compensated pressure.

2. The backup system claimed in claim 1 further including a reducing valve incorporated within said emergency network between said emergency valve and said emergency port of said variable load valve.

3. The backup system claimed in claim 2 further including a primary cutout valve for controlling said main transfer valve such that when said primary cutout valve is energized said main transfer valve assumes said piloted state and when said primary cutout valve is deenergized said main transfer valve assumes said unpiloted state.

4. The backup system claimed in claim 3 further including a means for electrically controlling pressure in said brake pipe.

5. The backup system claimed in claim 4 wherein said means comprises:

(a) an application valve supplied from said main reservoir pipe for providing when energized a control pressure;

(b) a second relay valve having a supply port linked to said main reservoir pipe and a control port for receiving said control pressure; said second relay valve for providing from an output port thereof an output pressure proportional to the pressure impinging upon said control port thereof;

(c) a release valve for venting when energized pressure from said control port of said second relay valve;

(d) a second transfer valve for operating in (I) an unpiloted state wherein said output port of said second relay valve is disconnected from said brake pipe and (II) a piloted state wherein said output port of said second relay valve is linked to said brake pipe thereby enabling said second relay valve to provide said output pressure to said brake pipe;

(e) a secondary cutout valve for controlling said second transfer valve such that when said secondary cutout valve is energized said second transfer valve assumes said piloted state and when said secondary cutout valve is deenergized said second transfer valve assumes said unpiloted state;

(f) a brake pipe transducer for converting said brake pipe pressure to a first feedback signal; and (g) a brake pipe control transducer for converting said control pressure at said control port of said second relay valve to a second feedback signal.

6. The backup system claimed in claim 5 further including an electronic controller for controlling (A) operation of said primary and said secondary cutout valves and (B) operation of said application and said release valves according to the dictates of at least one command signal and said first and said second feedback signals.

7. The backup system claimed in claim 1 further including a primary cutout valve for controlling said main transfer valve such that when said primary cutout valve is energized said main transfer valve assumes said piloted state and when said primary cutout valve is deenergized said main transfer valve assumes said unpiloted state.

8. The backup system claimed in claim 7 further including a means for electrically controlling pressure in said brake pipe.

9. The backup system claimed in claim 8 wherein said means comprises:

(a) an application valve supplied from said main reservoir pipe for providing when energized a control pressure;

(b) a second relay valve having a supply port linked to said main reservoir pipe and a control port for receiving said control pressure; said second relay valve for providing from an output port thereof an output pressure proportional to the pressure impinging upon said control port thereof;

(c) a release valve for venting when energized pressure from said control port of said second relay valve;

(d) a second transfer valve for operating in (I) an unpiloted state wherein said output port of said second relay valve is disconnected from said brake pipe and (II) a piloted state wherein said output port of said second relay valve is linked to said brake pipe thereby enabling said second relay valve to provide said output pressure to said brake pipe;

(e) a secondary cutout valve for controlling said second transfer valve such that when said secondary cutout valve is energized said second transfer valve assumes said piloted state and when said secondary cutout valve is deenergized said second transfer valve assumes said unpiloted state;

(f) a brake pipe transducer for converting said brake pipe pressure to a first feedback signal; and (g) a brake pipe control transducer for converting said control pressure at said control port of said second relay valve to a second feedback signal.

10. The backup system claimed in claim 9 further including an electronic controller for controlling (A) operation of said primary and said secondary cutout valves and (B) operation of said application and said release valves according to the dictates of at least one command signal and said first and said second feedback signals.

11. A backup system for pneumatically backing up an electronic system of compensating for load in applying brakes on a railcar truck equipped with brake pipe controlled brake equipment, said brake equipment including a main reservoir pipe, a brake pipe and a truck control valve, said backup system comprising:

(a) a variable load valve having a supply port in communication with a distribution network, a control port in communication with said distribution network, a load weigh port for receiving pressure indicative of load borne by said railcar, and an emergency port for receiving pressure via an emergency network; said variable load valve for providing from an output port thereof (I) a first load compensated pressure in response to pressure at said control and said load weigh ports and (II) a second load compensated pressure in response to pressure at said control, said load weigh and said emergency ports;

(b) a main relay valve having a supply port linked to said main reservoir pipe and a control port connected to said output port of said variable load valve; said main relay valve for providing from an output port thereof an output pressure proportional to the pressure acting on said control port thereof;

(c) a main control valve having an emergency valve and a 3-way valve, said emergency valve venting said emergency network as long as brake pipe pressure stays above an emergency level below which said emergency valve links said distribution and said emergency networks, said 3-way valve having a first pilot port in communication with said brake pipe and a second pilot port communicating with a control reservoir; and (d) a main transfer valve for operating in (I) a piloted state wherein said truck control valve is disconnected from said output port of said main relay valve and is linked to said main reservoir pipe thereby placing said main control valve in a cut-out mode and (II) an unpiloted state wherein said truck control valve is linked to said output port of said main relay valve thereby placing said main control valve in a cut-in mode wherein said 3-way valve responds by assuming:

(A) a release state, in response to said brake pipe pressure increasing relative to pressure in said control reservoir, wherein said 3-way valve exhausts said supply and said control ports of said variable load valve and thus prevents said main relay valve from outputting said output pressure;

(B) a service state, in response to said brake pipe pressure dropping relative to pressure in said control reservoir yet remaining above said emergency level, wherein said 3-way valve links said main reservoir pipe with said distribution network thereby allowing pressure to build against said supply and said control ports of said variable load valve whereupon said variable load valve outputs said first load compensated pressure thus causing said main relay valve to output to said truck control valve said output pressure proportional to said first load compensated pressure; and (C) an emergency state wherein said 3-way valve continues operating according to said service state yet said brake pipe pressure falls below said emergency level causing said emergency valve to link said emergency network with said distribution network and allow pressure from said main reservoir pipe to build against said emergency port thereby causing said variable load valve to output said second load compensated pressure thus causing said main relay valve to output to said truck control valve said output pressure proportional to said second load compensated pressure.

12. The backup system claimed in claim 11 further including a reducing valve incorporated within said emergency network between said emergency valve and said emergency port of said variable load valve.

13. The backup system claimed in claim 12 further including a primary cutout valve for controlling said main transfer valve such that when said primary cutout valve is energized said main transfer valve assumes said piloted state and when said primary cutout valve is deenergized said main transfer valve assumes said unpiloted state.

14. The backup system claimed in claim 13 further including a means for electrically controlling pressure in said brake pipe.

15. The backup system claimed in claim 14 wherein said means comprises:

(a) an application valve supplied from said main reservoir pipe for providing when energized a control pressure;

(b) a second relay valve having a supply port linked to said main reservoir pipe and a control port for receiving said control pressure; said second relay valve for providing from an output port thereof an output pressure proportional to the pressure impinging upon said control port thereof;

(c) a release valve for venting when energized pressure from said control port of said second relay valve;

(d) a second transfer valve for operating in (I) an unpiloted state wherein said output port of said second relay valve is disconnected from said brake pipe and (II) a piloted state wherein said output port of said second relay valve is linked to said brake pipe thereby enabling said second relay valve to provide said output pressure to said brake pipe;

(e) a secondary cutout valve for controlling said second transfer valve such that when said secondary cutout valve is energized said second transfer valve assumes said piloted state and when said secondary cutout valve is deenergized said second transfer valve assumes said unpiloted state;

(f) a brake pipe transducer for converting said brake pipe pressure to a first feedback signal; and (g) a brake pipe control transducer for converting said control pressure at said control port of said second relay valve to a second feedback signal.

16. The backup system claimed in claim 15 further including an electronic controller for controlling (A) operation of said primary and said secondary cutout valves and (B) operation of said application and said release valves according to the dictates of at least one command signal and said first and said second feedback signals.

17. The backup system claimed in claim 11 further including a primary cutout valve for controlling said main transfer valve such that when said primary cutout valve is energized said main transfer valve assumes said piloted state and when said primary cutout valve is deenergized said main transfer valve assumes said unpiloted state.

18. The backup system claimed in claim 17 further including a means for electrically controlling pressure in said brake pipe.

19. The backup system claimed in claim 18 wherein said means comprises:

(a) an application valve supplied from said main reservoir pipe for providing when energized a control pressure;

(b) a second relay valve having a supply port linked to said main reservoir pipe and a control port for receiving said control pressure; said second relay valve for providing from an output port thereof an output pressure proportional to the pressure impinging upon said control port thereof;

(c) a release valve for venting when energized pressure from said control port of said second relay valve;

(d) a second transfer valve for operating in (I) an unpiloted state wherein said output port of said second relay valve is disconnected from said brake pipe and (II) a piloted state wherein said output port of said second relay valve is linked to said brake pipe thereby enabling said second relay valve to provide said output pressure to said brake pipe;

(e) a secondary cutout valve for controlling said second transfer valve such that when said secondary cutout valve is energized said second transfer valve assumes said piloted state and when said secondary cutout valve is deenergized said second transfer valve assumes said unpiloted state;

(f) a brake pipe transducer for converting said brake pipe pressure to a first feedback signal; and (g) a brake pipe control transducer for converting said control pressure at said control port of said second relay valve to a second feedback signal.

20. The backup system claimed in claim 19 further including an electronic controller for controlling (A) operation of said primary and said secondary cutout valves and (B) operation of said application and said release valves according to the dictates of at least one command signal and said first and said second feedback signals.

* * * * *